US005382943A

United States Patent [19]

Tanaka

[11] Patent Number: 5,382,943

[45] Date of Patent: Jan. 17, 1995

[54] REMOTE MONITORING UNIT

[76] Inventor: Mutuo Tanaka, No. 5-24-19, Sakaecho, Tachikawa-shi, Tokyo, Japan

[21] Appl. No.: 958,671

[22] Filed: Oct. 8, 1992

[51] Int. Cl.[6] .......................... G08B 1/08; H04N 7/18

[52] U.S. Cl. .................................... 340/539; 340/531; 340/522; 340/693; 340/500; 340/517; 340/521; 340/632; 348/143

[58] Field of Search ............... 340/539, 531, 506, 500, 340/517, 521, 522, 632, 691-693, 825.3, 825.32; 358/108; 348/135, 143, 151, 152, 155, 162, 164

[56] References Cited

U.S. PATENT DOCUMENTS

| | | | |
|---|---|---|---|
| 4,511,886 | 4/1985 | Rodriguez | 340/531 |
| 4,673,974 | 6/1987 | Ito et al. | 340/531 |
| 4,857,912 | 8/1989 | Everett, Jr. et al. | 340/825.32 |
| 5,132,968 | 7/1992 | Cephus | 340/539 |

FOREIGN PATENT DOCUMENTS

| | | |
|---|---|---|
| 0028933 | 5/1981 | European Pat. Off. . |
| 0435007 | 7/1991 | European Pat. Off. . |
| 651984 | 10/1985 | France . |
| 2186404 | 8/1987 | United Kingdom . |

OTHER PUBLICATIONS

European Search Report No. 92309237.3.

*Primary Examiner*—Donnie L. Crosland

*Attorney, Agent, or Firm*—Andrus, Sceales, Starke & Sawall

[57] ABSTRACT

A remote monitoring apparatus includes a camera for producing a video signal from a picture of a remote site location being monitored, an image processor for outputting an image signal through an image processing process for the video signal, a microphone for producing a sound signal from a sound at the location, a temperature sensor for outputting a detection signal when a temperature change higher than a predetermined level is detected at the location, a gas sensor for outputting a detection signal when a concentration of oxygen gas smaller than a predetermined first level or a concentration of hydrogen gas greater than a predetermined second level is detected in the location, a converter for outputting digital signals by converting the image signal, the sound signal and the detection signals, and a radio transmitter for transmitting the digital signals of the converter to a radio receiver of a control equipment via radio transmission. In this apparatus, the camera, the image processor, the microphone, the temperature sensor, the gas sensor, the converter, and the radio transmitter are built in an enclosure case and the security of the remote site location is monitored from a central control equipment by using the remote monitoring unit placed at the remote site location.

6 Claims, 3 Drawing Sheets

REMOTE MONITORING UNIT

BACKGROUND OF THE INVENTION

1. Field of the Invention

The present invention generally relates to a remote monitoring unit, and more particularly to a remote monitoring unit for monitoring the security of a remote site building from a central control equipment via radio transmission.

2. Description of the Prior Art

Conventionally, a security control system has been utilized as a counter measure, for preventing crimes and disasters in a building (or an office) whose security is to be monitored. The security control system generally includes a camera, a fire detecting sensor and other sensors installed at a remote site location to be monitored, and a central control equipment installed in a security corporation. A video signal output by the camera and detection signals output by the sensors are transmitted from the building to the central control equipment via a transmission cable linking the monitored building to the central control equipment.

In a case of the security control system of the type described above, a security personnel at a location of the central control equipment always monitors the security of a plurality of buildings by means of video signals and detection signals received from the remote site, and controls operations of cameras and sensors installed in :he monitored buildings in a concentrated manner. It is known that a camera, a temperature sensor, a gas sensor and other sensors are used as surveillance sensor, installed in the monitored buildings. The temperature sensor senses the occurrence of a fire at a monitored :location by detecting a temperature change there higher than a prescribed level. The gas sensor senses the presence of smoke at the monitored location by Detecting a concentration of a specific gas there greater than a prescribed level.

When the above described monitoring system is used for security purposes, it is necessary to separately install several surveillance sensors such as a camera and a temperature sensor at different locations of a remote site to be monitored. Also, it is necessary to separately install several telephone lines or cables for transmitting output signals of the respective surveillance sensors from the remote site building to the central control location. Separately made installations of the sensors and the transmission lines have been very troublesome. Thus, the installation of the security control system becomes expensive, as the system requires several surveillance sensors to be placed in the remote site building.

When a showroom of the building is monitored, several surveillance sensors of the above described security control system must be placed at locations of the showroom; this is detrimental to the appearance of objects being displayed in the showroom. It is thus desirable that the surveillance sensors of the security control system are built so as to be compact and not detrimental to the appearance of the objects at the monitored locations.

SUMMARY OF THE INVENTION

Accordingly, it is a general object of the present invention to provide an improved remote monitoring apparatus in which the above described problems are eliminated.

Another and more specific object of the present invention is to provide a remote monitoring apparatus for use in a security control system, which apparatus includes a plurality of different surveillance sensors accommodated in an enclosure case and can be easily and inexpensively installed at a location of a monitored site with no undesired effects on the appearance of the monitored object. The above mentioned object of the present invention is achieved by a remote monitoring apparatus which includes a camera for producing a video signal from a picture of a remote site location being monitored, an image processor for outputting an image signal through an image processing process from the video signal produced by the camera, a microphone for producing a sound signal from a sound at the remote site location, a temperature sensor for outputting a detection signal when a temperature change higher than a predetermined level is detected at the remote site location, a gas sensor for outputting a detection signal when a concentration of oxygen gas smaller than a predetermined first level or a concentration of hydrogen gas greater than a predetermined second level is detected in the remote site location, a converter for outputting digital signals by converting the image signal of the image processor, the sound signal of the microphone, the detection signal of the temperature sensor, and the detection signal of the gas sensor, and a radio transmitter for transmitting the output digital signals of the converter to a radio receiver of a control equipment via radio transmission, the control equipment being capable of telecommunications of the output digital signals with a central control equipment via a public line. In this remote monitoring apparatus, the camera, the image processor, the microphone, the temperature sensor the gas sensor, the converter, and the radio transmitter are built together in an enclosure case to form the remote monitoring apparatus, and the security of the remote site location is monitored from the central control equipment by placing the remote monitoring apparatus at the remote site location.

According to the remote monitoring unit of the present invention, several surveillance sensors are accommodated in the enclosure case, and it is not necessary to separately place the surveillance sensors and the transmission lines therefor at locations of a remote site building to be monitored. Thus, the installation of the remote monitoring unit can be easily made at a low cost. The remote monitoring unit of the present invention is constructed as a one-piece unit, and no undesired effects result on the appearance of the monitored object when the unit is installed. In addition, the output signals of the surveillance sensors 3 through 6 are transmitted to the control center 7 via radio transmission, thus preventing the transmission of the signals from being inoperative when a fire occurs at the monitored location as in the conventional monitoring system which requires the installation of the transmission lines for transmitting the signals.

Other objects and further features of the present invention will become apparent from the following detailed description when read in conjunction with the accompanying drawings.

DESCRIPTION OF THE PREFERRED EMBODIMENT

Figure 1:
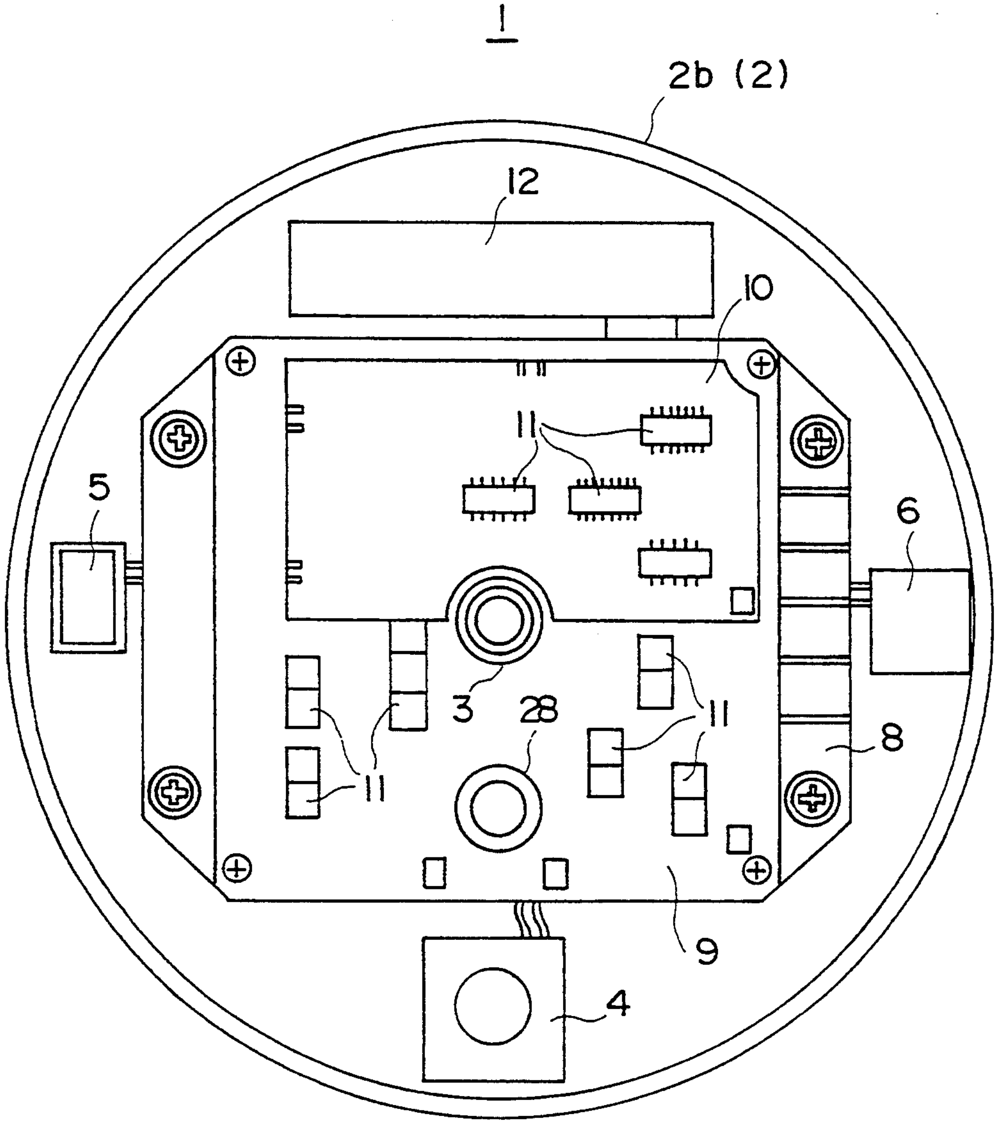
FIG. 1 is a plan view showing a preferred embodiment of a remote monitoring unit according to the present invention.
Figure 2:
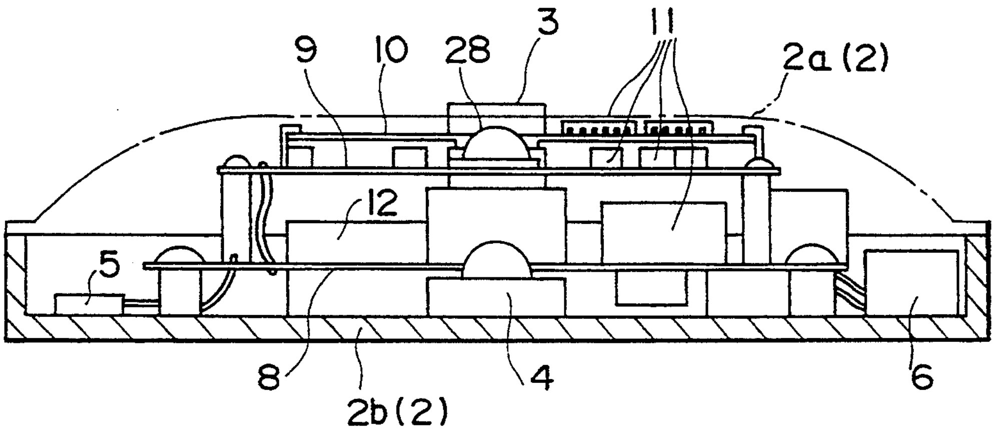
FIG. 2 is a sectional view showing the remote monitoring unit shown in FIG. 1.
Figure 3:
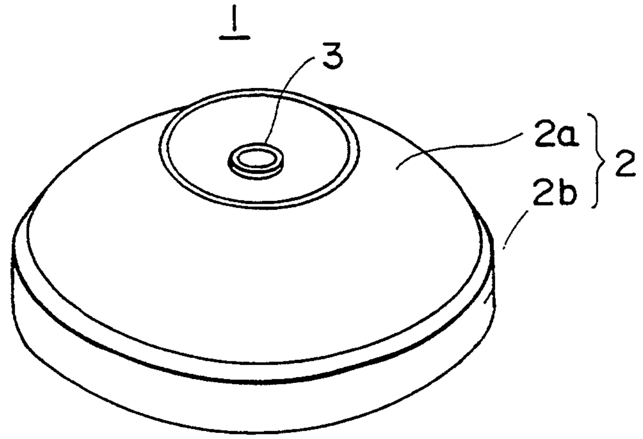
FIG. 3 is a perspective view showing the remote monitoring unit accommodated in a domed case.

A description will now be given, with reference to FIGS. 1 through 3, of a preferred embodiment of a remote monitoring unit according to the present invention. FIGS. 1 and 2 show a remote monitoring unit according to the present invention which is used in a security control system. As shown in FIGS. 1 and 2, this remote monitoring unit 1 includes a case 2 for enclosing a black-and-white camera 3, a temperature sensor 4, a microphone 5, a gas sensor 6, an infrared lamp 28, a radio transmitter 12, and other component parts therein. The case 2 has an upper domed cover 2*a* and a lower base 2*b*, as shown in FIG. 3. FIGS. 1 and 2 show a condition of the remote monitoring unit when the upper domed cover 2*a* is removed from the lower base 2*b*.

The camera 3 of the remote monitoring unit 1 is a black-and-white, charged-coupled device (CCD) camera which utilizes solid-state image sensors to produce approximately 250 thousand picture elements. The picture receiving angle of the camera 3 is set to an angle of 120 degrees relative to a center line of the monitoring unit 1. The camera 3 having a relatively large height is arranged at an upper central portion of the remote monitoring unit 1 corresponding to the top center of the upper domed cover 2*a*. In the remote monitoring unit 1 shown in FIG. 3, only a top portion of the camera 3 is exposed to the exterior, at the top of the upper domed cover 2*a*. The temperature sensor 4, the microphone 5, and the gas sensor 6, which are relatively small in height, are arranged at lower peripheral portions of the remote monitoring unit 1 corresponding to outer peripheral portions of the lower base 2*b*. The arrangement mentioned above allows the construction of a remote monitoring unit having a smaller height than in the prior art technology. The camera 3 generates a video signal providing a motion picture of a monitored location (e.g., an office or a showroom), and this signal is output to the radio transmitter 12 via an image processor 13 (shown in FIG. 4).

The infrared lamp 28 is provided in the vicinity of the camera 3 in order to project infrared light to the monitored location so that a clear picture of the monitored location can be taken by means of the black-and-white camera 3. The infrared light emitted by the infrared lamp 28 is invisible to the human eye. By means of the camera 3 and the infrared lamp 28, it is possible to pick up a picture of a very dark location so that the conditions of such a location may be monitored without bringing the remote monitoring unit to the attention of a person illegally entering the location. If a color camera is provided in the remote monitoring unit, it is necessary to illuminate the monitored location using a lamp which emits a visible light. However, if the color camera is used, together with such a lamp, a burglar entering the location would immediately notice the presence of the camera and the lamp. According to the monitoring unit of the present invention, the black-and-white camera 3 and the infrared lamp 28 are used together, and it is thus possible to pick up a picture of a monitored location without bringing the remote monitoring unit to the attention of a person entering the location. Thus, the security of the location can be effectively monitored.

The temperature sensor 4 of the remote monitoring unit 1 is a thermoelectric sensor which utilizes a platinum thermocouple for sensing a temperature change due to the heat of a person entering the monitored location. The temperature sensor 4 of this embodiment uses a plurality of heat wires (e.g. sixteen heat wires) to increase the accuracy of the temperature measurement. By means of this temperature sensor, it is possible to detect a temperature change (due to the heat of a person entering the monitored location) in the monitored location greater than a predetermined normal temperature level. Thus, when a burglar enters the monitored location wherein the temperature sensor 3 is in operation, the temperature sensor 3 outputs a detection signal to the radio transmitter 12 via an A/D converter 15 (shown in FIG. 4) of the remote monitoring unit 1.

Instead of the temperature sensor of the type mentioned above, an infrared sensor may also be used in the remote monitoring unit 1. The infrared sensor senses a change of infrared light effected when a heat source moves in a measurement area. Thus, by means of the infrared sensor, a temperature change greater than a predetermined normal temperature level at the monitored location can also be sensed. Hence, it is possible to detect whether or not a Derson enters the monitored location by means of the infrared sensor as in the case of the above mentioned temperature sensor 4.

The microphone 5 of the remote monitoring unit 1 is a flat, non-directional microphone which can collect a sound in various areas of the monitored location. The microphone 5, during operation, generates a signal from a sound in the monitored location, and this signal is output to the radio transmitter 12 via the A/D converter 15 immediately when a sound is produced at the monitored location. The use of the flat microphone allows the construction of a compact, thin remote monitoring unit.

The gas sensor 6 is built in a one-piece form as shown in FIGS. 1 and 2. The gas sensor 6 is made from a combination of a limited current type oxygen sensor and a thin-film type hydrogen sensor, so that it can detect whether or not a concentration of oxygen gas at the monitored location is smaller than a predetermined level, and detect whether or not a concentration of hydrogen gas at the monitored location is greater than a predetermined level. In this respect, it is known that if a fire occurs in a closed place, a concentration of hydrogen gas is increased and a concentration of oxygen gas is decreased even before carbon dioxide is increasingly produced due to the combustion reaction. Thus, by means of the gas sensor 6, early detection of a fire occurring at the monitored location can be achieved. When the gas sensor 6 detects occurrence of a fire at the monitored location, the gas sensor 6 outputs a detection signal to the radio transmitter 12 via the A/D converter 15.

In the remote monitoring unit 1 according to the present invention, the camera 3, the microphone 5, and the infrared lamp 28 are normally switched off and not in operation. When any abnormal condition (gas or heat) of the monitored location is detected by either the gas sensor 6 or the temperature sensor 4, the operations of the camera 3, the microphone 5, and the infrared lamp 28 are immediately commenced in response to the detection signal output by either the gas sensor 6 or the temperature sensor 4. Therefore, when the occurrence of a fire at the monitored location is detected by the gas sensor 6, the detection signal and the picture of the monitored location are transmitted by the radio transmitter 12 from the remote monitoring unit to a radio receiver of a control center via radio transmission. The above mentioned information is further transmitted from the control center to a central control equipment via a public line. The occurrence of a fire is then notified to an operator at the central control equipment by utilizing the picture signal and the detection signal, and he can view the picture of the monitored location displayed on a monitor of the central control equipment so as to check whether or not a fire has actually occurred at the monitored location. Accordingly, a countermeasure can be quickly taken in accordance with the causes and conditions of the fire occurring therein or any person entering the monitored location. Also, erroneous detection of a fire or intruder due to a malfunction of the security control system can be discovered in advance.

The remote monitoring unit 1 includes the image processor 13 (shown in FIG. 4), for receiving an image signal from the camera 3 and performing the image processing for the received image signal. It also includes the A/D converter 15 for receiving the signals from the sensors 4 through 6 and the image processor 13, to produce digital signals therefrom, and it includes a control part 30 (shown in FIG. 4) for receiving the detection signals of the sensors 4 and 6 so as to control operations of the camera 3, the microphone 5 and the infrared lamp 28 in response to the detection signals being received. These circuits of the remote monitoring unit 1 are mounted on three printed circuit boards 8 through 10. The remote monitoring unit 1 of this embodiment having four surveillance sensors accommodated in the enclosure case 2 requires several electronic parts 11 for processing the output signals of these surveillance sensors. The electronic parts 11 are divided into three groups, and they are respectively arranged on the printed circuit boards 8 through 10.

As shown in FIG. 2, the first printed circuit board 8 with the largest surface area is raised from the lower case 2*b* of the case 2, the second printed circuit board 9 with an intermediate surface area is raised from the first board 8, and the third printed circuit board 10 with a smallest surface area is raised from the second board 9. The printed circuit boards 8 through 10 on which the electronic parts 11 are mounted are thus arranged, and they are built on the case 2 such that peripheral portions of each of the boards 8 though 10 are in accordance with the configuration of the upper domed cover 2*a*. This arrangement also allows the construction of a compact, thin remote monitoring unit.

The radio transmitter 12 of the remote monitoring unit 1 transmits the output signals of the surveillance sensors 3 through 6 from the remote monitoring unit i to a control center 7 (shown in FIG. 4) via radio transmission. The radio transmitter 12 has a built-in antenna 17 and is formed in a small-sized transmitter. As described above, the radio transmitter 12 is provided in the remote monitoring unit 1 at a peripheral portion of the lower base 2*b* which is located outside the printed circuit boards 8 through 10. This arrangement allows the construction of a compact, thin remote monitoring unit.

As described above, the remote monitoring unit 1 includes several surveillance sensors 3 through 6 accommodated in the case 1, and it is not necessary to separately install the sensors and the corresponding transmission lines at various locations of a remote site building to be monitored. Thus, the installation of the remote monitoring unit can be easily made at a low cost. The remote monitoring unit is constructed as a one-piece unit, and the unit installed at the remote site location is not detrimental to the appearance of a monitored object. Also, the remote monitoring unit can be easily assembled and the manufacture can be made at a low cost.

It should be noted that the black-and-white camera 3, the microphone 5, and the infrared lamp 28 are not always in operation in the remote monitoring unit 1. The operations of the camera 3, the microphone 5, and the lamp 28 are commenced immediately when any person entering the monitored location is detected by the temperature sensor 4 or when a predetermined level of the concentration of hydrogen gas or oxygen gas is detected by the gas sensor 6. Thus, an increased life of each of these parts can be achieved, and the power required for the operations of the remote monitoring unit can be reduced because the camera 3, the infrared lamp 28, and tile microphone 5, requiring a relatively large consumption of power, are less frequently driven.

Figure 4:
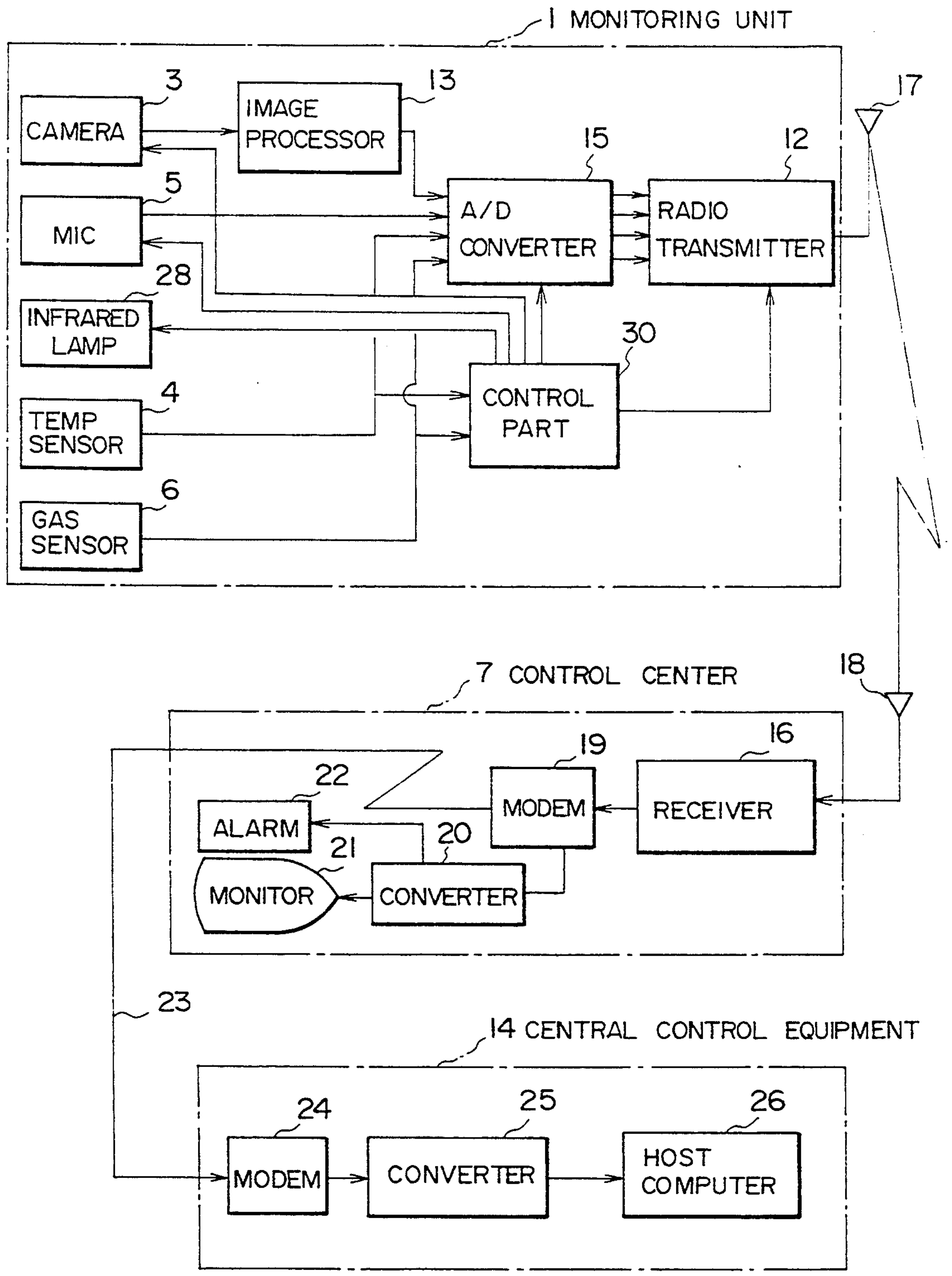
FIG. 4 is a block diagram showing a security control system which utilizes the remote monitoring unit according to the present invention.

Next, a more detailed description will be given of operations performed by the remote monitoring unit according to the present invention. FIG. 4 shows the arrangement of a security control system which utilizes the remote monitoring unit according to the present invention. In FIG. 4, those parts which are the same as corresponding parts shown in FIGS. 1 and 2 are designated by the same reference numerals, as in the previous figures. As shown in FIG. 4, the security control system includes at least a remote monitoring unit 1 as described above, a remote site control center 7 for receiving information from the monitoring unit 1 and transmitting the information, and a central control equipment 14 for receiving the information from the control center 7.

In general, the security control system to which the present invention is applied has a hierarchical structure including the central control equipment 14, a plurality of control centers 7, and a plurality of remote monitoring units 1. The central control equipment 14 is installed in, for example, a security corporation, and receives monitoring information from each of the control centers 7 and controls operations of the control centers 7. Each control center 7 is installed in, for example, a guard operation room of a remote site building to be monitored. The remote monitoring units 1 are respectively installed in compartment rooms of the remote site building. Each control center 7 in the guard operation room of the building receives monitoring information from each of the remote monitoring units 1 in the building, and transmits the received information from the remote site building to the central control equipment 14 of the guard corporation via a public line.

As shown in FIG. 4, the remote monitoring unit also includes a control part 30 for controlling operations of the above described parts including the camera 3, the temperature sensor 4, the microphone 5, the gas sensor 6, the infrared lamp 28, the image processor 13, the A/D converter 15, and the radio transmitter 12. In the remote monitoring unit described above, only the temperature sensor 4 and the gas sensor 6 are normally in operation; the camera 3, the microphone 5 and the infrared lamp 28 are normally switched off and not in operation. When a temperature change greater than a predetermined level due to the heat of a person entering the monitored location or a fire occurring therein is detected by the temperature sensor 4, or when a concentration of oxygen gas smaller than a predetermined level, or a concentration of hydrogen gas greater than a predetermined level due to a fire occurring therein is detected by the gas sensor 6, the output signal of the temperature sensor 4 and/or the output signal of the gas sensor 6 are sent to the control part 30. Then, the control part 30 respectively switches on the camera 3, the microphone 5 and the infrared lamp 28 by sending a control signal to these parts 3, 5 and 28 in response to the output signal of the temperature sensor 4 or the output signal of the gas sensor 6. Thus, the operations of the camera 3, the infrared lamp 28, and the microphone 5 are commenced by the control part 30, so that the camera 3 takes a picture of the monitored location, the microphone 5 collects sound therein, and the infrared lamp 28 projects infrared light to the monitored location.

The image processor 13 of the remote monitoring unit 1 receives a picture of a monitored object picked up by the camera 3, performs an image processing for the received picture, and outputs a signal, indicating the picture of the monitored object, to the A/D converter 15. The output signal of each of the temperature sensor 4, the microphone 5 and the gas sensor 6 are also output to the A/D converter 15. The A/D converter 15 converts the output signals of the surveillance sensors to digital signals. The radio transmitter 12 transmits the digital image signal and the digital detection signals (which are received from the A/D converter 15) to the radio receiver 16 of the control center 7 via radio transmission. The radio transmitter 12 of the remote monitoring unit 1 includes a built-in antenna 17, and the radio receiver 16 of the control center 7 includes an antenna 18.

When digital signals from the remote monitoring unit 1 are received by the radio receiver 16 of the control center 7, the received digital signals are converted by a modem 19 into a signal form suitable for long-distance transmission. The modulated signals are transmitted from the control center 7 to the central control equipment 14 via a public line 23 (such as a telephone line). In the meantime, the digital signals received at the modem 19 are also sent to a D/A converter 20 of the control center 7, and the D/A converter 20 converts the received digital signals into analog signals. These analog signals are supplied from the converter 20 to a monitor 21 and an alarm unit 22. At the monitor 21, the picture of the monitored location taken by the camera 3 is displayed. The alarm unit 22 produces a suitable acoustic or visible alarm information in accordance with the received analog signal when the signal received from the remote monitoring unit 1 indicates the detection of any disaster or intruder at the monitored location.

When the signals from the remote monitoring unit 1 are received by the central control equipment 14 via the public line 23, a modem 24 of the central control equipment 14 reconverts the received signals, and a converter 25 converts the signals into a suitable form. The converted signals from the converter 25 are then input to a host computer 26, and the corresponding monitoring information indicated by the received signals is stored in a storage medium of the host computer 26.

In the above described embodiment, the black-and-white camera 3, the temperature sensor 4, the microphone 5, the gas sensor 6, the image processor 13, and the infrared lamp 28 are all accommodated in the case 2. However, a remote monitoring unit including all these parts in the case 2 is not always necessary. For example, when an unmanned room into which no person will enter is to be monitored, it is not necessary to provide the microphone 5 in the remote monitoring unit 1. When the monitored location is not a dark place, it is not necessary to provide the black-and-white camera 3 and the infrared lamp 28 in the remote monitoring unit, or a color camera can be used instead.

Further, the present invention is not limited to the above described embodiment, and variations and modifications may be made without departing from the scope of the present invention.

What is claimed is:

1. A remote monitoring apparatus for monitoring security of a remote site location from a central control equipment via radio transmission, said remote monitoring apparatus comprising:

camera means for producing a video signal from a picture of a remote site location being monitored;

an image processor for outputting an image signal, through an image processing process, for said video signal produced by said camera means;

a microphone for producing a sound signal from a sound at said location;

a temperature sensor for outputting a detection signal when a temperature change higher than a predetermined level is detected at said location;

a gas sensor for outputting a detection signal when a concentration of oxygen gas smaller than a predetermined first level or a concentration of hydrogen gas greater than a predetermined second level is detected in said location;

a converter for outputting digital signals by converting said image signal of said image processor, said sound signal of said microphone, said detection signal of said temperature sensor, and said detection signal of said gas sensor;

a radio transmitter for transmitting said output digital signals of said converter to a radio receiver of a control equipment via radio transmission, said control equipment being capable of telecommunications of said output digital signals with a central control equipment via a public line and an enclosure case that houses said camera means, said image processor, said microphone, said temperature sensor, said gas sensor, said converter, and said radio transmitter;

wherein the security of said remote site location is monitored from said central control equipment by using said remote monitoring apparatus placed at said remote site location.

2. A remote monitoring unit according to claim 1, wherein said camera means and said microphone are normally not in operation, and start operating when said detection signal is output by said temperature sensor due to said temperature change.

3. A remote monitoring unit according to claim 1, wherein said camera means and said microphone are normally not in operation, and start operating when said detection signal is output by said gas sensor due to either said concentration of said oxygen gas lower than the predetermined first level or said concentration of said hydrogen gas higher than the predetermined second level.

4. A remote monitoring unit according to claim 1, wherein said camera means comprises a black-and-white camera, and an infrared lamp provided in the vicinity of said black-and-white camera for projecting infrared light to said remote site location.

5. A remote monitoring unit according to claim 1, wherein said enclosure case includes an upper domed cover and a lower base, and said camera means includes a black-and-white camera utilizing a number of solid-state image sensors, said camera being arranged at an upper central portion of said camera whose location corresponds to a top central portion of said upper domed cover, said temperature sensor, said microphone and said gas sensor being arranged at lower peripheral portions of said case, said lower peripheral portions having locations corresponding to outer peripheral portions of said lower base.

6. A remote monitoring unit according to claim 1, wherein said gas sensor is formed with an oxygen sensor and a hydrogen sensor, said oxygen sensor detecting whether or not a concentration of oxygen gas in said remote site location is smaller than said predetermined first level due to a fire occurring therein, and said hydrogen sensor detecting whether or not a concentration of hydrogen gas in said remote site location is greater than said predetermined second level due to a fire occurring therein, a detection signal thus being output to said converter when said concentration of said oxygen gas is smaller than said predetermined first level, or when said concentration of said hydrogen gas is greater than said predetermined second level.

* * * * *